United States Patent [19]

Shay

[11] 4,277,075
[45] Jul. 7, 1981

[54] MOVING DOLLY
[76] Inventor: Robert W. Shay, 501 SW. Second St., Hallandale, Fla. 33009
[21] Appl. No.: 24,325
[22] Filed: Mar. 27, 1979
[51] Int. Cl.³ .......................... B62B 3/02; B62B 3/04; B62B 3/10
[52] U.S. Cl. ............................ 280/47.36; 280/79.1 A
[58] Field of Search .............. 280/47.34, 47.35, 47.36, 280/47.17, 47.18, 47.19, 79.1 R, 79.1 A; 248/129

[56] References Cited
U.S. PATENT DOCUMENTS

| D. 146,848 | 6/1947 | Brickson | 280/47.19 X |
|---|---|---|---|
| 1,164,332 | 12/1915 | Brown | 280/79.1 A X |
| 1,175,312 | 3/1916 | Simpson | 280/79.1 A X |
| 1,895,844 | 1/1933 | Contois | 280/79.1 R |
| 2,582,737 | 1/1952 | Aries | 280/47.36 |
| 4,166,638 | 9/1979 | Prado | 280/79.1 R X |

FOREIGN PATENT DOCUMENTS 1147005  4/1969  United Kingdom ................ 280/47.18

Primary Examiner—Randolph A. Reese
Assistant Examiner—D. W. Underwood
Attorney, Agent, or Firm—Harvey B. Jacobson

[57] ABSTRACT

A moving dolly is disclosed for transporting bulky articles, such as grand pianos, crates, and the like. A framework form fits a standard cushioning device conventionally employed in carrying a baby grand piano sounding board during moving or transport operations. An elongated rigid framework for receiving the cushioning device is mounted on corner caster wheels to facilitate moving in any desired direction. A detachable handle means is pivotally secured to one end of the framework, and can be detached and repositioned at the opposite end as needed during use of the device.

6 Claims, 6 Drawing Figures

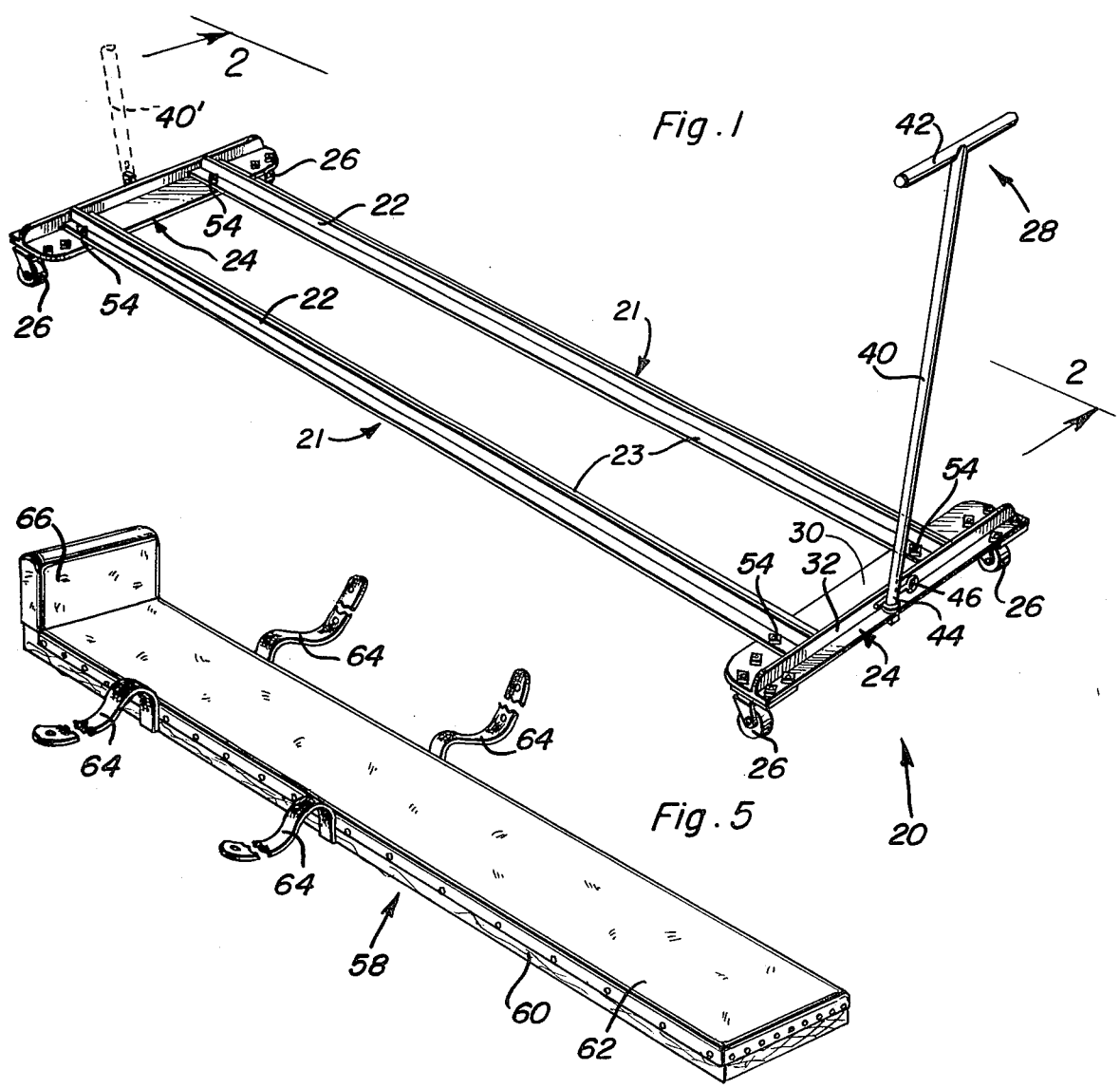
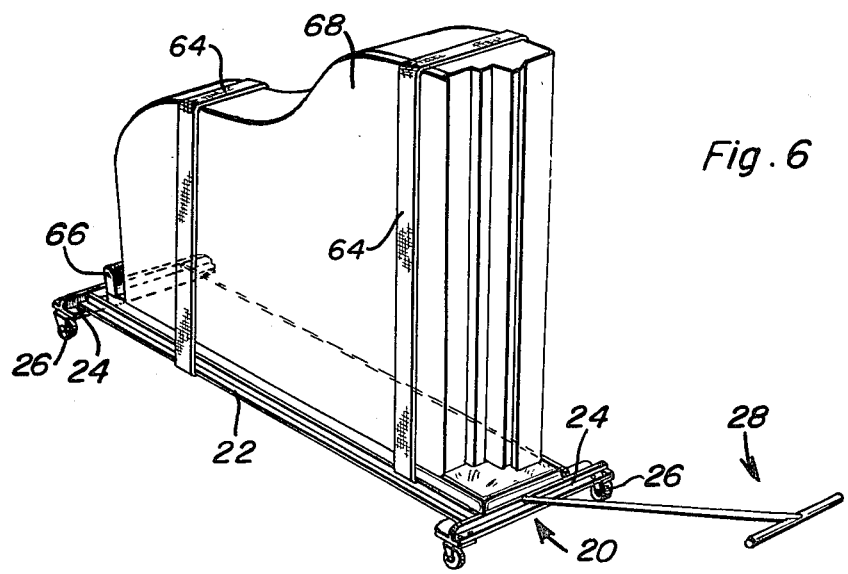

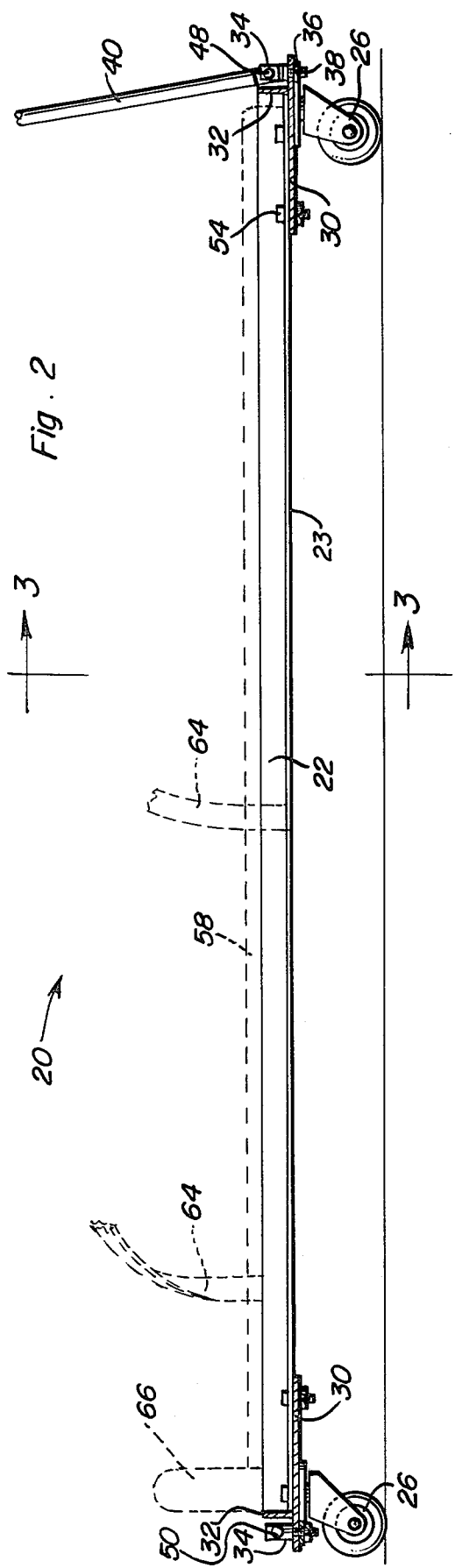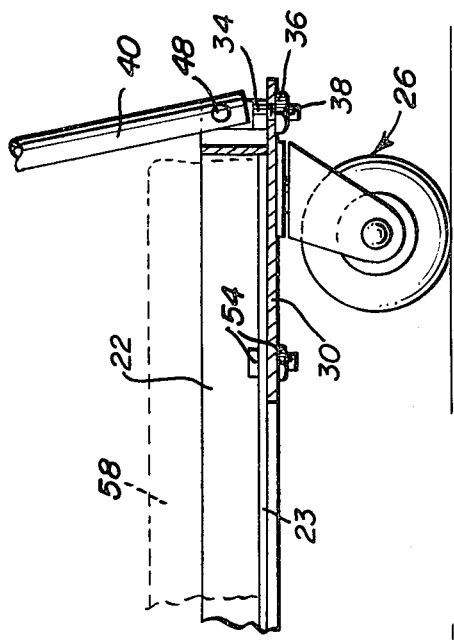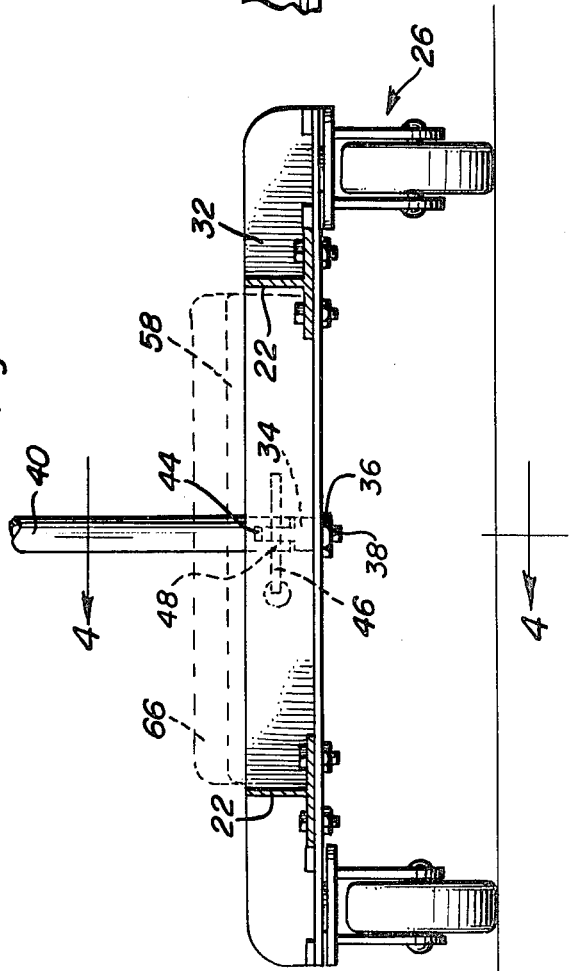

MOVING DOLLY

BACKGROUND OF THE INVENTION

Field of the Invention

The invention relates to furniture moving equipment, particularly to a device constructed for transport of a bulky object with use of a minimum of moving personnel. Specifically, a baby grand piano can be safely and successfully transported by only two persons with use of the present invention.

DISCLOSURE STATEMENT

Wheeled cart frames are known, including constructions having adjustable handles, in the prior art. Also disclosed are devices with swivelled wheels, with wheels mounted somewhat outside a truck framework, and a device with a movable end gate. The following prior art patents disclose these devices and exemplify the state of the prior art:

U.S. Pat. Nos.
1,849,028, Mar. 8, 1932;
2,827,302, Mar. 18, 1958;
2,840,384, June 24, 1958;
2,990,191, June 27, 1961;
3,169,780, Feb. 16, 1965;
3,173,708, Mar. 16, 1965 and
4,022,413, May 10, 1977.

The prior art approaches to moving or transporting of large objects or articles have fallen short of reducing moving personnel to a minimum, in that at least one operator has been required for actually moving the load, while two or more additional personnel are required for safely guiding, balancing, and securing a load, particularly a load as valuable and awkward as a grand piano sounding board. Another disadvantage characterizing prior approaches is the lack of maneuverability of any wheeled moving device, particularly in transfer operations in close or confined spaces, such as an elevator. It is well known that control of a pulled cart is superior to that degree of control obtainable when a cart is pushed, but, unless an elevator is provided with both a front and rear door, standard wheeled carts of conventional construction cannot be pulled entirely through the elevator and present problems of maneuverability therein.

SUMMARY OF THE INVENTION

This invention is intended to permit loading and transport of baby grand pianos, specifically the cabinet portion with the legs detached, by no more than two moving personnel. This is accomplished with use of a wheeled cart having a shape conforming to a conventional cushioning device comprising an elongated flat rigid plank or board covered with a resilient cushioning material on which the load rests. The cushioning device is supported around its periphery by a form fit framework equipped with caster wheels to support the cushioning device a short distance above the floor surface over which the load is to be transported. When the load is a bulky and flat but comparatively thin object, such as the cabinet portion of a grand piano, the present invention allows its transport by resting an even edge of the cabinet portion on the cushioning device held by the moving dolly of the present invention. It is then possible for one of two moving personnel to manually guide the dolly with an associated handle, while the other of the two personnel insures that the load does not tip and controls the stability of the transported object from the following end or side of the dolly. In either position, due to the shape of the cushioning device, the load is within easy arm length of the second of the two operating personnel.

Accordingly, it is an object of the invention to provide a moving dolly for transport of bulky and heavy, but comparatively thin objects, such as parts of a grand piano.

Another object of the invention is to allow for moving and transporting of such objects with a minimum of operating personnel, making moving of such objects safely possible with no more than two personnel.

Still another object of the invention is to provide a device having handle means readily detachable and attachable at either end of the dolly, in order to allow one of the two necessary operating personnel to remove and reattach the handle to permit pulling of the dolly from either end as desired.

A further object of the invention is to reduce, minimize, or eliminate the need to lift or carry heavy objects during moving operations.

Another further object of the invention is to reduce losses from damage during moving operations, particularly during transport of the cabinet portion of grand pianos.

Still another further object is to reduce occupational hazards associated with transporting of heavy and bulky objects, such as pianos.

Yet another further object is to provide a lifting device and method of operation which facilitates introduction into and withdrawal from a service elevator, such as in moving of household goods into or from an apartment building.

Another important object is to provide a device compatible with a standard cushioning device conventionally used in moving baby grand piano cabinets.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the device of the present invention, showing only the framework and associated handle, as well as (in phantom) a fragmentary portion of the handle when mounted at the opposite end of the device.

FIG. 2 is a longitudinal section view of the device taken substantially upon a plane passing along section line 2—2 on FIG. 1 and showing in phantom an associated cushioning device on which a transported load (not shown) is to be carried.

FIG. 3 is a transverse sectional view of the device, taken substantially upon a plane passing along section line 3—3 on FIG. 2, also showing in phantom the cushioning device.

FIG. 4 is an enlarged fragmentary sectional view of the right portion of the device shown in FIG. 2.

FIG. 5 is a perspective view of the cushioning device for use with the present invention.

FIG. 6 is a perspective view of the moving dolly of the present invention, the associated cushioning device, and a load in the form of a grand piano cabinet portion associated therewith.

DESCRIPTION OF THE PREFERRED EMBODIMENTS

The moving dolly of the present invention is designated generally by the numeral 20 in FIG. 1 and comprises a pair of longitudinal frame members 21, a pair of end supports 24, caster wheels 26 and handle means 28. Each frame member 21 is made up of a vertical retainer 22 and an inwardly projecting support flange 23, both retainer 22 and support flange 23 being longitudinally disposed between end supports 24. Each end support 24 is made up of support plate 30 and retainer bar 32, which can be welded to support plate 30 or can be otherwise attached. Alternatively, support plate 30 and retaining bar 32 can be integral construction. As illustrated in FIG. 2, pivot support 34 is attached to support plate 30 by nut 36, the lower portion 38 of pivot support 34 being threaded for mounting through a centered hole in support plate 30. Handle pull bar 40, at the upper end of which is mounted handle grip 42 has a slot 44 which falls substantially in a plane passing along the longitudinal direction of the device. A centrally located through hole 48 passes through the lower end of the pull bar 40 and in a fashion which allows removable pin 46 to attach pull bar 40 to pivot support 34 when slot 44 is placed over pivot support 34 with hole 48 on pull bar 40 coincident with hole 50 on pivot support 34. In such a configuration, pivot pin 46 slides into place in the manner shown in FIG. 3, pull bar 40 then being pivotable in a vertical plane and permitting pulling of the device by an operator. Support plate 30 is attached to longitudinal frame member 21 by bolt 54, but other attaching means, such as riveting, welding, or the like, can also be used. Handle pull bar 40 can be removed by removing pin 46, and can then be reattached at the opposite end of device 20 at the location shown in phantom by pull bar 40' in FIG. 1. Caster wheels 26 are preferably mounted below support plate 30 in a manner which permits swivelling through a full 360° to permit motion of dolly 20 in any desired direction. Cushioning element 58, best seen in FIG. 5, is made in a conventional fashion from plank or board 60, over which a resilient cushioning material 62 is tacked, with straps 64 being then attached along the edges of board 60 for use in securing a load resting on cushioning material 62. Cushioned headboard 66 provides additional support at the end of board 60 and a convenient support for an edge of a carried load, as best seen in FIG. 6 where a piano cabinet portion 68 is shown in the position actually used during use of the invention.

In making use of the invention during the process of moving a baby grand piano from, for example, a residential building to a moving truck, the moving dolly 20, as shown in FIG. 1, is provided with cushioning element 58 with headboard 66 placed opposite the end remote from handle means 28. After removing the legs from the piano, cabinet portion 68 is tipped and allowed to rest upon its edge cushioning surface 62 of cushioning element 58 in the manner shown in FIG. 6. Straps 64 are next secured around piano cabinet portion 68, preferably with one strap on each side of longitudinal frame member 21 passing upwardly along the inside edge of frame member 21, with the other strap 64 passing upwardly around the outside edge of frame member 21, thereby anchoring the object to the frame member, as well as the cushioning element. Fastening means (not shown), such as a buckle, snap, tieing device, or the like secure straps 64 in pairs until the load is to be removed from dolly 20. In proceeding with the actual moving operation, one of the two required personnel walks beside the load and manually guides and maintains the load in an upright position to prevent upset. The second of the moving personnel pulls dolly 20 with handle means 28 by adjusting the angle of handle pull bar to a convenient position and pulling on handle grip 42, guiding dolly 20 in the desired direction. If the load is to be placed into an elevator during transport operations such as the service elevator typically found in a multi-story apartment building, moving dolly 20 is expeditiously pulled directly into the elevator, handle means 28 are detached from pivot support 34 by pulling pin 46 from through hole 48, and during the descent or ascent of the elevator, handle means 28 is reattached at the opposite end of dolly 20 to the position illustrated in phantom in FIG. 1 by the numeral 40' for the handle pull bar. When unloading from the elevator, dolly 20 is then pulled in a direction opposite that from which it was pulled into the elevator, without the necessity for maneuvering inside the elevator itself. The two moving personnel proceed with transport of the loaded dolly to a transport track located at a loading platform, or to a loading ramp attached to the truck for loading from street or ground level. When proceeding with loading up a ramp, one of the two personel preferably exerts a pulling action through handle means 28 while moving backwardly upwardly along the ramp, while the other of the moving personnel preferably exerts a pushing and guiding action from behind dolly 20. Inasmuch as the load is under continuous and secure control during all phases of the moving operation with only two only two personnel required for the job, labor cost savings are realized in that a standard moving crew of four can be safely reduced to two for handling all phases of a moving operation, even including moving of a grand piano.

Inasmuch as heavy lifting is avoided even with the reduced size crew possible with the present invention, the job requirements need not exclude persons who are unable to lift heavy loads, thereby widening the range of potential personnel capable of performing moving operations, and at the same time minimizing the risk of occupational injury due to repeated lifting of heavy loads.

Dolly 20 is preferably constructed of dimensions which permit passage through a standard 30-inch doorway. When conventional moving operations are performed with a crew of four, wherein lifting of a piano cabinet along its length and carrying of the object through doorways presents a problem, due to the impossibility of personnel lifting along the side to also pass through the doorway, the present invention eliminates a major time and labor consuming bottleneck at doorways, and at the same time reduces substantially the possibility of damage to the article.

In view of the relative simplicity of design of the invention, maintenance expense of the dolly is minimal, and the device is serviceable even under severe operating conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A moving device for transporting a bulky object having greater width and height than depth, comprising, in combination, platform means for supporting the object in a generally vertical plane and framework means for supporting the platform means during transport of the object, said framework means comprising retaining means for holding the platform means, wheel means attached to the retaining means for permitting movement in any direction, handle means attached to the retaining means for manually pulling the device, and pivot means for pivotal movement of the handle means and for detachably attaching the handle means to a selectable location on the retaining means, said platform means including a cushioning element surfaced with a resilient cushioning material for supporting the object, the cushioning element comprising a substantially flat, elongated plank conforming in size to the framework means for support thereby in substantially horizontal configuration and a layer of cushioning material attached on the upper surface of the plank and presenting a contacting surface to the object, the plank including an upraised retaining portion at one end for more securely retaining the object resting on the cushioning element, said retaining means including a pair of substantially parallel longitudinal frame members having inwardly projecting flanges for supporting the cushioning element, the retaining means further comprising a pair of substantially parallel end supports attached to the longitudinal frame members for further support of the cushioning element, said cushioning element including fastening means for passing upwardly and securing said object during transport thereof by the moving device, said fastening means including a plurality of straps attached to the cushioning element, at least one strap passing upwardly along the inside edge of the frame member in securing relationship to the object, and at least one other strap passing upwardly around the outside edge of the frame member in securing relationship to the object.

2. The moving device of claim 1 wherein said longitudinal frame members further include vertical flanges longitudinally disposed between said end supports for further supporting and retaining said cushioning element within said framework means.

3. The moving device of claim 2 wherein said wheel means comprises a pair of caster wheels dependingly attached to the end supports, each of the caster wheels being swivellable through 360° for movement of the device in any desired direction.

4. The moving device of claim 3 wherein said handle means comprises a handle pull bar having a pivot end attached to said pivot means, the handle pull bar having a handle grip attached to the end of the pull bar remote from the pivot end for grippingly propelling the moving device.

5. The moving device of claim 4 wherein said pivot means includes a pivot bar centrally located on each of the pair of end supports, the handle pull bar having at its pivot end a slot having wings provided with transverse through holes, the pivot end being slidingly engageable over the pivot bar with the through holes in the pull bar in register with the through holes in the pivot bar, the pivot means further comprising a retaining pin removably insertable and fastenable through the pivot end of the handle pull bar and pivot bar to permit pivotal movement of the hand pull bar in a substantially vertical plane, to permit movement of the moving device by manual motion on the handle means, and to permit removal of the handle means from the pivot bar and reattachment at the pivot bar on the opposite end support.

6. The moving device of claim 5 wherein said pivot bar is attached to the end support by a threaded projection attached by a nut to the end support, said end support comprising a support plate through which said threaded projection passes, said end support further comprising a transverse upright retaining bar for enclosingly retaining the cushioning means to prevent longitudinal sliding or movement thereof, said longitudinal frame members being supported upon the support plate and bolted thereto.

* * * * *